(12) United States Patent
Riggins, II et al.

(10) Patent No.: US 10,873,394 B2
(45) Date of Patent: Dec. 22, 2020

(54) AUTOMATIC REPEAT REQUEST NETWORK TRANSPORT SYSTEM FOR TURBULENT FREE-SPACE OPTICAL COMMUNICATIONS LINKS

(71) Applicant: The Johns Hopkins University, Baltimore, MD (US)

(72) Inventors: James L. Riggins, II, Woodstock, MD (US); David D. Nicholes, Edgewater, MD (US); Joseph E. Sluz, Ellicott City, MD (US); Juan C. Juarez, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 16/560,293

(22) Filed: Sep. 4, 2019

(65) Prior Publication Data

US 2020/0099446 A1    Mar. 26, 2020

Related U.S. Application Data

(60) Provisional application No. 62/734,052, filed on Sep. 20, 2018.

(51) Int. Cl.
*H04B 10/112* (2013.01)
*H04L 1/18* (2006.01)
*H04L 12/861* (2013.01)

(52) U.S. Cl.
CPC .......... *H04B 10/112* (2013.01); *H04L 1/1812* (2013.01); *H04L 49/90* (2013.01)

(58) Field of Classification Search
CPC ...... H04B 10/112; H04L 1/1812; H04L 49/90
USPC .......................................................... 398/188
See application file for complete search history.

(56) References Cited

U.S. PATENT DOCUMENTS

| | | | | |
|---|---|---|---|---|
| 6,851,086 B2* | 2/2005 | Szymanski | ........... | H03M 13/09 714/781 |
| 7,218,648 B1* | 5/2007 | Jackson | .................. | H04L 41/08 370/445 |
| 7,567,535 B2* | 7/2009 | Singh | .................... | H04W 36/12 370/331 |
| 8,295,159 B2* | 10/2012 | Maheshwari | ......... | H04L 1/1883 370/216 |
| 2002/0053062 A1* | 5/2002 | Szymanski | ........... | H04L 1/0045 714/801 |
| 2006/0198341 A1* | 9/2006 | Singh | .................... | H04W 36/12 370/331 |

(Continued)

*Primary Examiner* — Abbas H Alagheband
(74) *Attorney, Agent, or Firm* — Noah J. Hayward (57) ABSTRACT

A free-space optical (FSO) retransmission device includes a memory bank partitioned into at least a source buffer indexed by segment identifications (IDs), an interface in communication with an optical terminal and an Ethernet network, and a programmable circuit configured to execute data process operations. The data process operations include receiving data from the Ethernet network, generating an FSO segment including the data received from the Ethernet network and a segment ID, generating and transmitting an outgoing FSO frame to the optical terminal, the outgoing FSO frame including an outgoing FSO segment, and storing the outgoing FSO segment in the source buffer until a corresponding acknowledgement is received in an inbound FSO frame from the optical terminal.

20 Claims, 7 Drawing Sheets

(56) References Cited

U.S. PATENT DOCUMENTS

2010/0177701 A1\* 7/2010 Maheshwari ......... H04L 1/1883
                                                     370/328
2016/0065592 A1\* 3/2016 Svigals ................. H04L 9/3234
                                                     726/3
2017/0249834 A1\* 8/2017 Wright ............. H04N 21/42204

\* cited by examiner

AUTOMATIC REPEAT REQUEST NETWORK TRANSPORT SYSTEM FOR TURBULENT FREE-SPACE OPTICAL COMMUNICATIONS LINKS

CROSS REFERENCE TO RELATED APPLICATIONS

This application claims priority to and the benefit of U.S. Provisional Application No. 62/734,052 filed on Sep. 20, 2018, the entire disclosure of which is incorporated herein by reference.

BACKGROUND

The disclosure relates generally to a retransmission system for free-space optical (FSO) communications, and more particularly, to an automatic repeat request network transport system for turbulent FSO communications links.

Conventionally, two FSO terminals establish and utilize a data link (e.g., an FSO link) to send and receive optical signals. For instance, the two FSO devices include and utilize some sort of beam steering element to actively point, send, and receive, therebetween, the optical signals. FSO communications on the data link between the two FSO devices offer the high bandwidth typical of fiber optic networks. However, the nature of FSO communications introduces losses, such as fades, not experienced in traditional fiber optic networks. These fades can be characterized under short or long varieties. Short fades can cause an optical signal to be lost for milliseconds or less. Short fades occur for numerous reasons, including imprecise pointing, clouds, and atmospheric disruptions with respect to the data link. Long fades can occur when the FSO link is lost for a longer amount of time. Long fades can be caused by large physical obstructions or by critical pointing errors, which take more than milliseconds to resolve.

In general, the FSO link can be utilized to provide a high bandwidth connection between networks that utilize Ethernet protocols. Yet, because the Ethernet protocols were designed for consistent and steady connections, losses (fade effects) not typically accounted for by the Ethernet protocols are introduced to these Ethernet networks when two FSO terminals establish and provide the FSO link therebetween. Thus an improved device, system, and/or method is needed to overcome the deficiencies noted above (including fade effects, for example) to provide a reliable FSO link between two FSO devices.

BRIEF DESCRIPTION

According to one or more embodiments, a free-space optical (FSO) retransmission device includes a memory bank partitioned into at least a source buffer indexed by segment identifications (IDs), an interface in communication with an optical terminal and an Ethernet network, and a programmable circuit configured to execute data process operations. The data process operations include receiving data from the Ethernet network, generating an FSO segment including the data received from the Ethernet network and a segment ID, generating and transmitting an outgoing FSO frame to the optical terminal, the outgoing FSO frame including an outgoing FSO segment, and storing the outgoing FSO segment in the source buffer until a corresponding acknowledgement is received in an inbound FSO frame from the optical terminal.

According to one or more additional embodiments, a method is performed by a free-space optical (FSO) retransmission device having a memory bank partitioned into at least a source buffer indexed by segment identifications (IDs), an interface in communication with an optical terminal and an Ethernet network, and a programmable circuit. The method includes executing data process operations by the programmable circuit, and the data process operations include receiving data from the Ethernet network, generating an FSO segment including the data received from the Ethernet network and a segment ID, generating and transmitting an outgoing FSO frame to the optical terminal, the outgoing FSO frame including an outgoing FSO segment, and storing the outgoing FSO segment in the source buffer until a corresponding acknowledgement is received in an inbound FSO frame from the optical terminal.

According to yet additional embodiments, a computer program product stored on a computer readable medium of a free-space optical (FSO) retransmission device has program instructions stored thereon. The FSO retransmission device includes a memory bank partitioned into at least a source buffer indexed by segment identifications (IDs), an interface in communication with an optical terminal and an Ethernet network, and a programmable circuit. The program instructions are executable by at least the programmable circuit to cause the programmable circuit to execute data process operations, including receiving data from the Ethernet network, generating an FSO segment having the data received from the Ethernet network and a segment ID, generating and transmitting an outgoing FSO frame to the optical terminal, the outgoing FSO frame having an outgoing FSO segment, storing the outgoing FSO segment in the source buffer until a corresponding acknowledgement is received in an inbound FSO frame from the optical terminal.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

A system for FSO communications that overcomes at least short fade and long fade concerns is provided herein.

For instance, in one or more embodiments, the system is a retransmission system, which can be a 10-Gigabit per second class physical layer retransmission system that is optimized for use on an FSO link that overcomes and mitigates the fast fades that are present in all FSO links. In this regard, the retransmission system turns a channel (e.g., the FSO link) that is relatively detrimental to most network communications (e.g., Ethernet network communications), into a channel that looks more like a fiber communications channel to an end user (e.g., a client or a client interface), thereby allowing the use of the FSO link much more efficiently.

Figure 1:
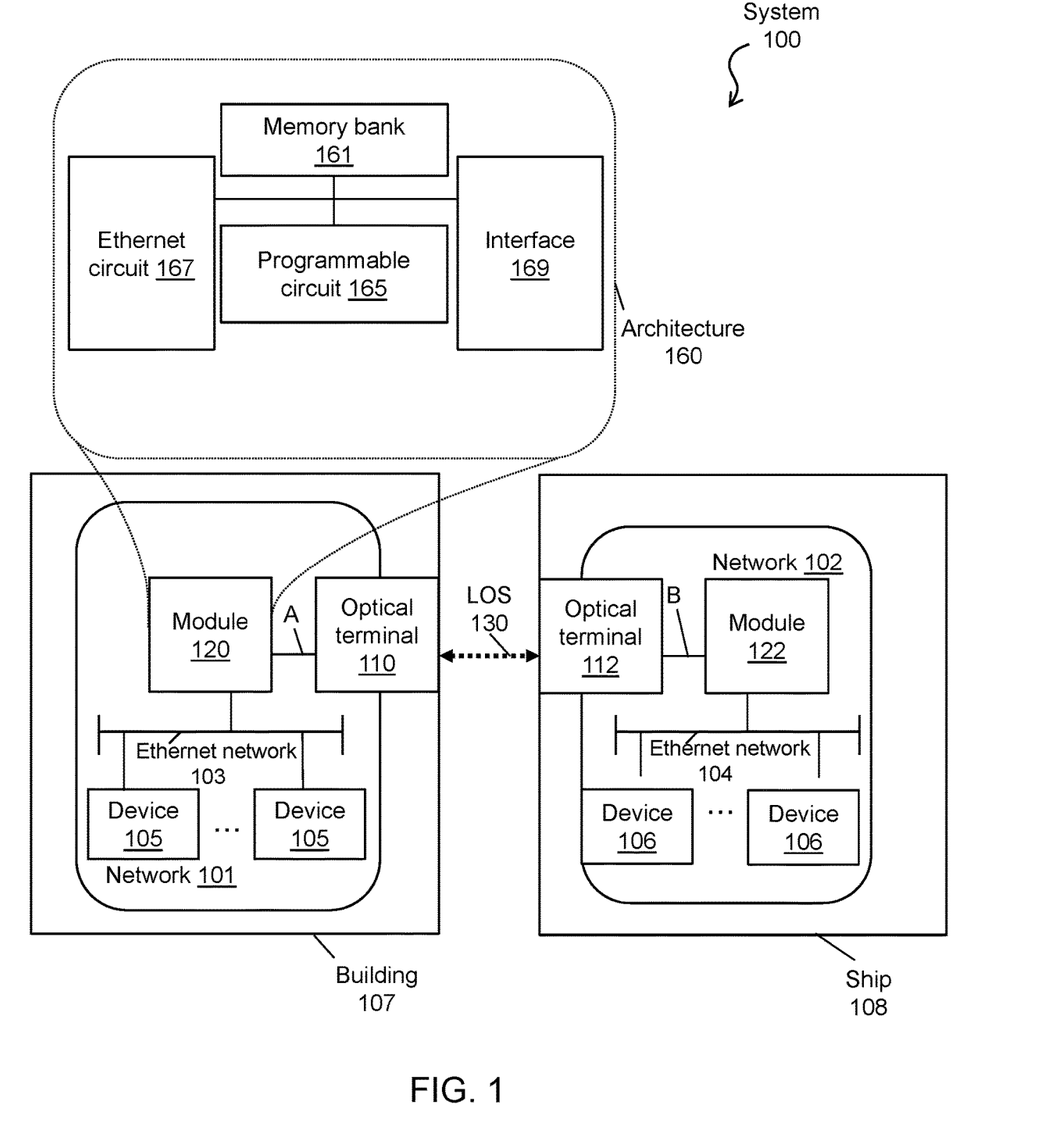
FIG. 1 depicts a system including two optical terminals and two optical modules connecting two networks according to one or more embodiments.

Turning now to FIG. 1, a system 100 (e.g., an FSO system) is depicted according to one or more embodiments. The system 100 can include at least two networks 101 and 102 (e.g., a first network 101 and a second network 102) connected via an FSO link. The networks 101 and 102 can be any type of network, for example, a local area network, a wide area network, a wireless network, and/or the Internet, including copper transmission cables, optical transmission fibers, wireless transmissions, routers, firewalls, switches, gateway computers, edge servers, and/or the like.

In accordance with one or more embodiments, the networks 101 and 102 can respectively include Ethernet networks 103 and 104 that support a plurality of devices 105 and 106, which can be a client or a client interface side of a channel (e.g., the FSO link). The plurality of devices 105 and 106 can be any electronic or computing devices and components, such as desktops, laptops, servers, tablets, phones, digital assistants, e-readers, and the like. The networks 101 and 102 support communications respectively between the plurality of devices 105 and 106. Further, the networks 101 and 102 are connected (through the FSO link) by at least two optical terminals 110 and 112 and corresponding modules 120 and 122, which, in one or more embodiments, are optical modules 120 and 122. The networks 101 and 102 may be in any location so long as a line of sight (LOS) 130 is present between the two optical terminals 110 and 112. The LOS 130 is representative of the space in which and the path on which the channel (e.g., the FSO link) is established and maintained. Note that the FSO link itself and the optical terminals 110 and 112 that support it, from the perspective of the modules 120 and 122, may be referred to an FSO interface.

The networks 101 and 102 reside on stationary locations and/or mobile objects, such as a sea vessel, a ship, a ground vehicle, an aircraft, a satellite, a building, a spaceship, a tower, a light house, a buoy, and the like, where a cost of running physical cables therebetween is prohibitive and/or impractical. As shown in FIG. 1, the networks 101 and 102 are located on a building 107 and a ship 108. In turn, the two optical terminals 110 and 112 can establish an FSO link, over-the-air across/along the LOS 130 (e.g., a free space between the building 107 and the ship 108), so that at least one device of the plurality of devices 105 of the network 101 can communicate with at least one device of the plurality of devices 106 of the network 102, and vice versa. In this way, the system 100 and components therein can be implemented with respect to one or more of FSO Communications, radio frequency (RF) communications, precise time synchronization between remote locations, passive radar, RF denied communications, high bandwidth marine communications, high bandwidth aerial communications, and satellite communications. Further, the system 100 and components therein can be utilized as a high bandwidth reliable data transport in an RF denied environment (e.g., low probability of detect), a fire control via an FSO/data fusion architecture (e.g., enabling support for fire control chain and data fusion of high bandwidth sensor inputs), and ship-to-ship communications. Ship-to-ship communications can also include aircraft, as well as sea vessels (i.e. ships), communicating with each other and/or with satellites (e.g., for 10-Gigabit in-transit internet). In this regard, the system 100 and components therein enables multiple simultaneous video teleconferences in-transit, enables uninterrupted telemetry data for owners and operators of the aircraft or the sea vessel, protects against aircraft or sea vessel loss, operates as an off-site black box, and enables the aircraft or the sea vessel to be remotely piloted in emergency situations.

The optical terminals 110 and 112 (e.g., a first optical terminal 110 and a second optical terminal 112) can be any free-space optical electronic, computer framework including and/or employing any number and combination of computing devices and components utilizing various communication technologies, as described herein. The optical terminals 110 and 112 are easily scalable, extensible, and modular, with the ability to change to different services or reconfigure some features independently of others. The optical terminals 110 and 112 interface with the modules 120 and 122 via optical fibers A and B that capture incoming signals and/or that transmit/send outgoing signals into the free-space between the building 107 and the ship 108 (e.g., over-the-air across/along the LOS 130). The optical fibers A and B and the modules 120 and 122 can utilize single-mode communications for higher data rates, e.g., greater than 10 Gigabits per second (Gbps) or multimode communications for lower data rates (e.g., less than 1 Gbps), as the optical terminals 110 and 112 permit universal interfacing with hardware and configurations. Note that the optical terminals 110 and 112 leverage a reciprocity of the incoming/outgoing signals, in that the optical terminals 110 and 112 transmit/send the outgoing signal out of a same terminal as the incoming signal is received and adjust a pointing of the outgoing signal based on an angle of the incoming signal.

The modules 120 and 122 (e.g., a first module 120 and a second module 122) can be any retransmission systems/devices or an automatic repeat request (ARQ) network transport systems for turbulent FSO communications links. The modules 120 and 122 can, thus, manage Ethernet frames to and from the Ethernet networks 103 and 104 (e.g., a client or client interface) and FSO frames to and from the FSO link (e.g., an FSO interface). Note that the FSO frames (also referred to as packets) encapsulate FSO segments, which further include data/information of the Ethernet frames. That is, an FSO segment is a user-packet of data/information from the Ethernet frame and with given a (unique) segment identification (ID) for eventual transmission within an FSO frame. As shown in FIG. 1, in accordance with one or more embodiments, the modules 120 and 122 can be configured as an architecture 160 including a memory bank 161, a programmable circuit 165, an Ethernet circuit 167, and an interface 169, each interconnected within the architecture 160.

The memory bank 161 of the architecture 160 can be a single high speed dual data rate (DDR) memory bank (e.g., a DDR3 random access memory (RAM) bank) that is partitioned into a source (e.g., transmit (TX)) and sink (e.g., receive (RX)) buffers and indexed by segment numbers (e.g., one or more segment ID). In accordance with one or more embodiments, the single high speed DDR memory bank can provide a buffer area to the programmable circuit 165 to survive fades with high data fidelity/throughput.

The programmable circuit 165 of the architecture 160 can be implemented in software/firmware on any electronic circuitry (e.g., a field-programmable gate array (FPGA), an application-specific integrated circuit (ASIC), or a programmable logic array (PLA)) that may execute computer readable program instructions by utilizing state information therein to personalize the electronic circuitry. The software/firmware of the programmable circuit 165 executes to perform operations and tasks that utilize the memory bank 161, the Ethernet circuit 167, and the interface 169, as described herein.

The Ethernet circuit 167 of the architecture 160 can be a physical portion of an Ethernet architecture. For instance, the Ethernet circuit 167 can be an Ethernet port, such as a tri-mode Ethernet port with physical layer (PHY) circuitry. Further, the PHY circuitry connects a link layer device therein (e.g., a medium access control or MAC) to a physical medium, such as an optical fiber or copper cable.

The interface 169 can include one or more physical ports and related circuitry. For instance, the interface 169 can be a quad small form-factor pluggable (QSFP) interface (e.g., a QSFP+ interface). In accordance with one or more embodiments, the QSFP+ interface can be split into four bi-directional ports, one or more of which are configured as independent 10-Gigabit Ethernet ports to provide a client or a client interface (e.g., to the Ethernet network 103). One or more ports can be used send a unique communications payload to the FSO interface (e.g., to the optical terminal 110).

Operationally, in accordance with one or more embodiments, the modules 120 and 122 (via the software/firmware executed by the programmable circuit 165) implement a combination of forward error correction (FEC) and round robin ARQ error control protocol. Forward error correction adds redundancy to the FSO segments and frames, which enables a receiver (e.g., a far side optical terminal 110 or 112) to detect and correct bit errors that occur in received FSO frames. Implementing forward error correction improves the FSO link performance by overcoming short fades. The round robin ARQ error control protocol applies several key principles to address the demanding requirements of the FSO link. The methods involve always efficiently filling the FSO link with unique data (e.g., the FSO frames) via a round robin buffer, performing positive acknowledgement on FSO segments of the FSO frames received, and using TX and RX buffers to mitigate transient channel failures. This retransmission scheme improves FSO link performance by overcoming fades which degrade the FSO link beyond forward error correction's ability to correct.

In other applications, the modules 120 and 122 (via the software/firmware executed by the programmable circuit 165) can implement a method for determining when the TX buffer has overflowed for the receiver and data/information handling best practices for the receiver during overflow. To rapidly recover from frequent FSO fades, an active search continuously correlates a preamble detection to determine an FSO segment start of an FSO frame over the channel (e.g., the FSO link).

Further, the modules 120 and 122 (via the software/firmware executed by the programmable circuit 165) can implement sending command and control data (e.g., global positioning system (GPS) coordinates) between networks 101 and 102 via the channel (e.g., the FSO link) without interfering with user traffic (on the networks 101 and 102 themselves). The modules 120 and 122 can also implement simultaneously driving two separate optical transmitters (e.g., the optical terminals 110 and 112) for spatial diversity terminal architectures with bit and phase delay determined from a loopback test. In addition, the modules 120 and 122 can turn off FSO frame retransmission for low-latency transport of data across the channel.

Furthermore, the modules 120 and 122 can be modified to monitor incoming traffic (e.g., FSO frames) to assess when the channel (e.g., the FSO link) is faded and preemptively retransmit outgoing data (e.g., FSO frames) given the reciprocity of the channel. The modules 120 and 122 can also be modified to implement time diversity by retransmitting high priority data (e.g., FSO frames) multiple times at intervals determined based on channel fade statistics, which the modules 120 and 122 could monitor. The modules 120 and 122 can implement a very low latency retransmission architecture by leveraging a hybrid of time diversity and active channel monitoring.

Figure 2:
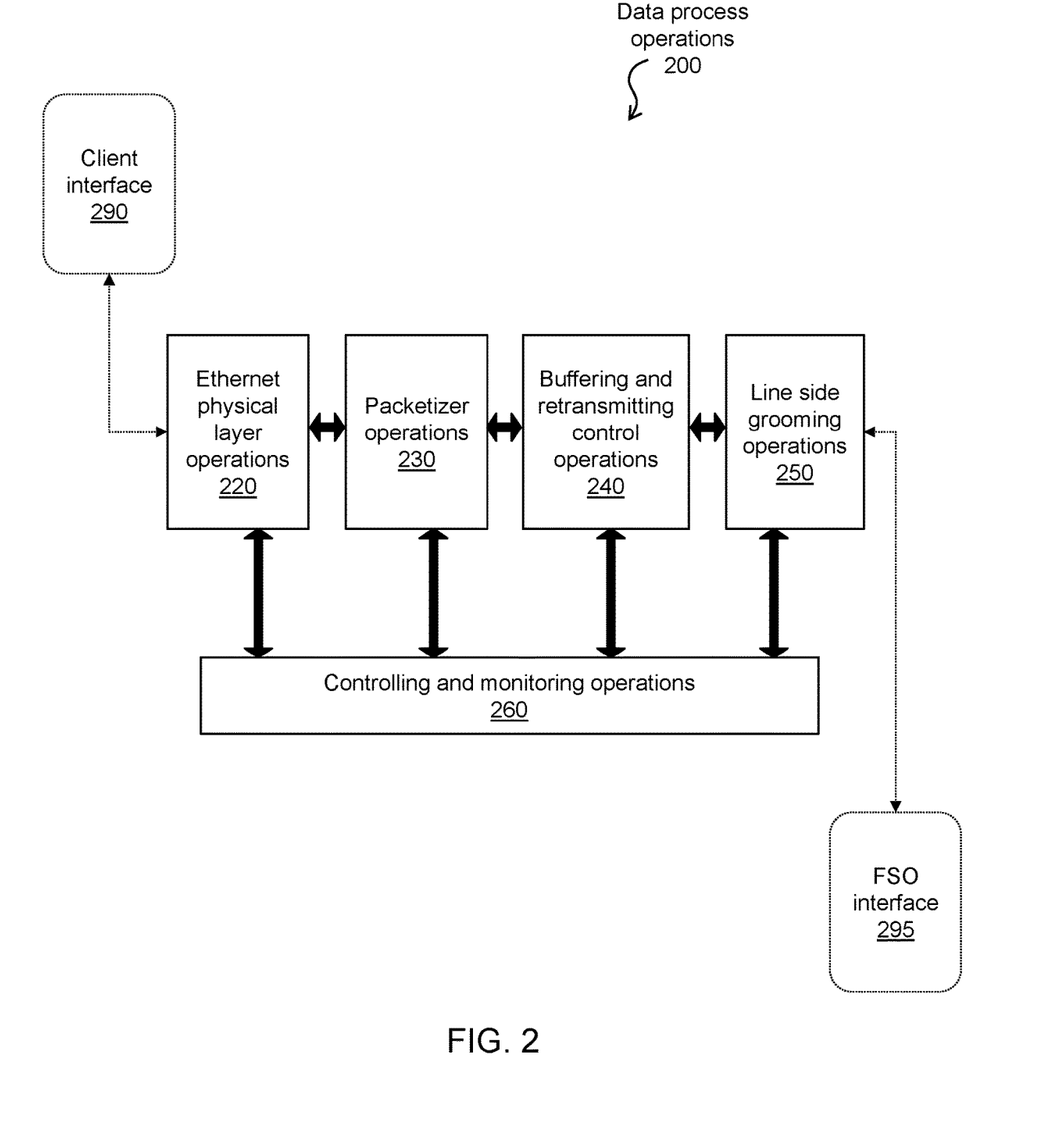
FIG. 2 depicts a block diagram of data process operations of an optical module according to one or more embodiments.

Turning now to FIG. 2, in accordance with one or more embodiments, a block diagram of data process operations 200 is shown. For purposes of illustration and discussion herein, the data process operations 200 are an example set of operations performed by the programmable circuit 165 of the architecture 160 implemented in the module 120 shown FIG. 1. As shown in FIG. 2, the data process operations 200 (e.g., which can be, for example, a bidirectional 10-Gigabit Ethernet data process) include Ethernet physical layer operations 220, packetizer operations 230, buffering and retransmitting control operations 240, line side grooming operations 250, and controlling and monitoring operations 260. These operations 220, 230, 240, 250, and 260 enable the flow, conditioning, and monitoring of data (e.g., Ethernet and FSO frames) between a client interface 290 and an FSO interface 295.

The client interface 290 can represent a connection point to the Ethernet networks 103 and 104 and devices 105 and 106 therein of FIG. 1. The client interface 290, for example, can be a standard 10-Gigabit Ethernet interface of a network switch of one of the Ethernet networks 103 and 104. The FSO interface 295 can represent the first and second optical terminals 110 and 112 of FIG. 1.

The Ethernet physical layer operations 220 generate and implement Ethernet protocols to communicate Ethernet frames with the client or the client interface 290, which allows the modules 120 and 122 of FIG. 1 to appear like a wire (e.g., to have or seem to have the same or similar characteristics as a wire, with varying latencies based on channel conditions, etc.) to the Ethernet networks 103 and 104. For example, the Ethernet physical layer operations 220 implement MAC for any PHY circuitry of the modules 120 and 122. The Ethernet physical layer operations 220 include receiving and providing the Ethernet frames from and to the client (e.g., the client interface 290 connecting to the Ethernet networks 103 and 104 of FIG. 1)

The packetizer operations 230 include operations that intercept, manipulate, and log data/information (e.g., packet capture operations of the data/information of the Ethernet frames and FSO segments) that passes through the programmable circuit 165 of the architecture 160 of FIG. 1. In this regard, the packetizer operations 230 track, process, and re-package the Ethernet frames (e.g., and data/information therein) from the Ethernet physical layer operations 220 into FSO segments. As discussed herein, an FSO segment is a user-packet of data/information from the Ethernet frame and with a segment ID for eventual transmission within an FSO frame to the FSO interface 295. That is, the segment ID, along with the data/information that will allow the Ethernet frames to be re-created from the FSO segment, is appended to the Ethernet payload and forms the FSO segment. The FSO segments are sent to a memory multiplexing arbiter of the buffering and retransmitting control operations 240 for storage in the TX buffer (e.g., in the memory bank 161 of FIG. 1). On the receive path, the FSO segments within the FSO frame that have been received are broken back into the original Ethernet frames and sent out to the client or the client interface 290 through the Ethernet physical layer operations in exact order they were transmitted 220.

The buffering and retransmitting control operations 240 partition the memory bank 161 of FIG. 1 into one or more TX and RX buffers, which are indexed by segment IDs, so that the FSO segments can be stored and managed according to their segment IDs. In accordance with one or more embodiments, the buffering and retransmitting control operations 240 further provide priority multiplexing to arbitrate between four data streams (e.g., Client In/Out with respect to the client interface 290 and FSO In/Out with respect to the FSO interface 295) interfacing the memory bank 161 and realize a high data throughput of the FSO segments. The buffering and retransmitting control operations 240 include round robin buffer control operations to fill the channel (e.g., the FSO link) with unique data (e.g., the FSO frames) for the total round trip propagation time of the FSO link, which has the added effect of interleaving the data stream.

With respect to receipt processing by the buffering and retransmitting control operations 240, the RX buffer stores the FSO segments received over the FSO link before they are sent to the Ethernet physical layer operations 220 to be turned back into Ethernet frames. Due to the interpolating nature of the round robin transmitter and channel fades, the FSO segments (and therefore the data/information therein, for example) will often be out of order. The data/information must be provided in order to the client interface 290. In turn, the RX buffer stores the FSO segments so no data/information is lost while waiting for a next contiguous segment.

In this way, the technical effects and benefits of the buffering and retransmitting control operations 240 include providing error free data/information to the client interface 290, even though fades are being experienced on the FSO interface 295. To provide error free data/information, the buffering and retransmitting control operations 240 implements automatic repeat requests for receipt confirmation of the FSO segments (e.g., acknowledgements) from a far side (e.g., an opposite optical terminal 110 or 112) before any FSO segment is considered to be received. In other words, a near side fills the FSO link with packets (e.g., FSO frames) that includes the same FSO segment until confirmation comes back for that same FSO segment, which guarantees that the FSO segment (e.g., and data/information therein) arrives at the far side whole (e.g., guarantees 100% data availability) despite fade concerns.

The buffering and retransmitting control operations 240 can determine when the RX buffer has overflowed for the receiver (e.g., a far side optical terminal 110 or 112 of FIG. 1) and provide data/information handling (e.g., FSO segment handling) for the receiver (e.g., the module 120 or 122 receiving the FSO segment) during overflow. In an extremely faded environment, the TX buffer can overflow causing FSO segments to be thrown away, which can further cause the receiver on the opposite side of the FSO link to wait forever for an FSO segment that will never come because it has been discarded. In this event, the only thing that will make the receiver increment again is if an entire buffer's worth of additional data is received (which means an entire buffer's worth of data was lost in the receiver). In effect, the RX buffer of the far side optical terminal 110 or 112 of FIG. 1 has looped. The buffering and retransmitting control operations 240 enable the receiver to ascertain with a high confidence when the transmitter on the other side of the FSO link (e.g., a near side optical terminal 110 or 112) is overflowing and process the data (e.g., FSO segments) with minimum additional loss and latency. For instance, to avoid the problem of the receive buffer loop, the segment ID field within each FSO segment is sized to account and track for many more segments than the size of the actual buffer, if any FSO segment is received which is located more than a full buffer length than the minimum pointer in the receiver, then the receiver knows that the TX buffer has overflowed and the current minimum packet pointer needs to be incremented. If such a case occurs, the receiver enters a "stressed" mode in which the receiver establishes a new minimum pointer based on the FSO segment that was just received. Any FSO segments in the RX buffer between the old minimum and the new minimum are read out of the buffer and any holes are skipped over (e.g., causing data/information loss). Instead, the receiver waits as long as possible for FSO segment reception before skipping the hole while still keeping the RX buffer from looping, which would cause data/information in the receive buffer to be overwritten (e.g., lost) by new FSO segments.

The line side grooming operations 250 include the processes of grouping and encoding the FSO segments into larger packets and frames (e.g., FSO frames) that include a preamble, which is used to find the start of the FSO segments. In this regard, the line side grooming operations 250 prepare the FSO frames with the preamble to be sent to the FSO interface 295 (e.g., to the first and second optical terminals 110 and 112 of FIG. 1 from the modules 120 and 122, respectively). The preamble of the FSO frames can include cyclic redundancy check (CRC) and acknowledgment (ACK) fields. Note that CRC and ACK fields enable validation that FSO segments were received without bit errors. In accordance with one or more embodiments, the line side grooming operations 250 include an active search that continuously correlates for preamble and ACK detection of the FSO frames received from FSO interface 295 to determine an FSO segment start within an FSO frame over the channel (e.g., the FSO link). The line side grooming operations 250 can also execute a 7% overhead telecommunications grade Reed Solomon forward error correction engine that enables greater sensitivity of the receiver (e.g., the module 120 or 122) by fixing small burst errors on the FSO link.

The controlling and monitoring operations 260 provide monitoring and reporting of real time data and channel statistics to ensure quality of the FSO link. In this regard, the controlling and monitoring operations 260 can manage and maintain control of, statistics for, and monitoring of the other operations 220, 230, 240, and 250. In accordance with one or more embodiments, the controlling and monitoring operations 260 also provide 1-Gigabit Ethernet command and control interface that implement sending command and control data (e.g., GPS coordinates) between networks 101 and 102 via the FSO link without interfering with user traffic of the networks 101 and 102.

Figure 3:
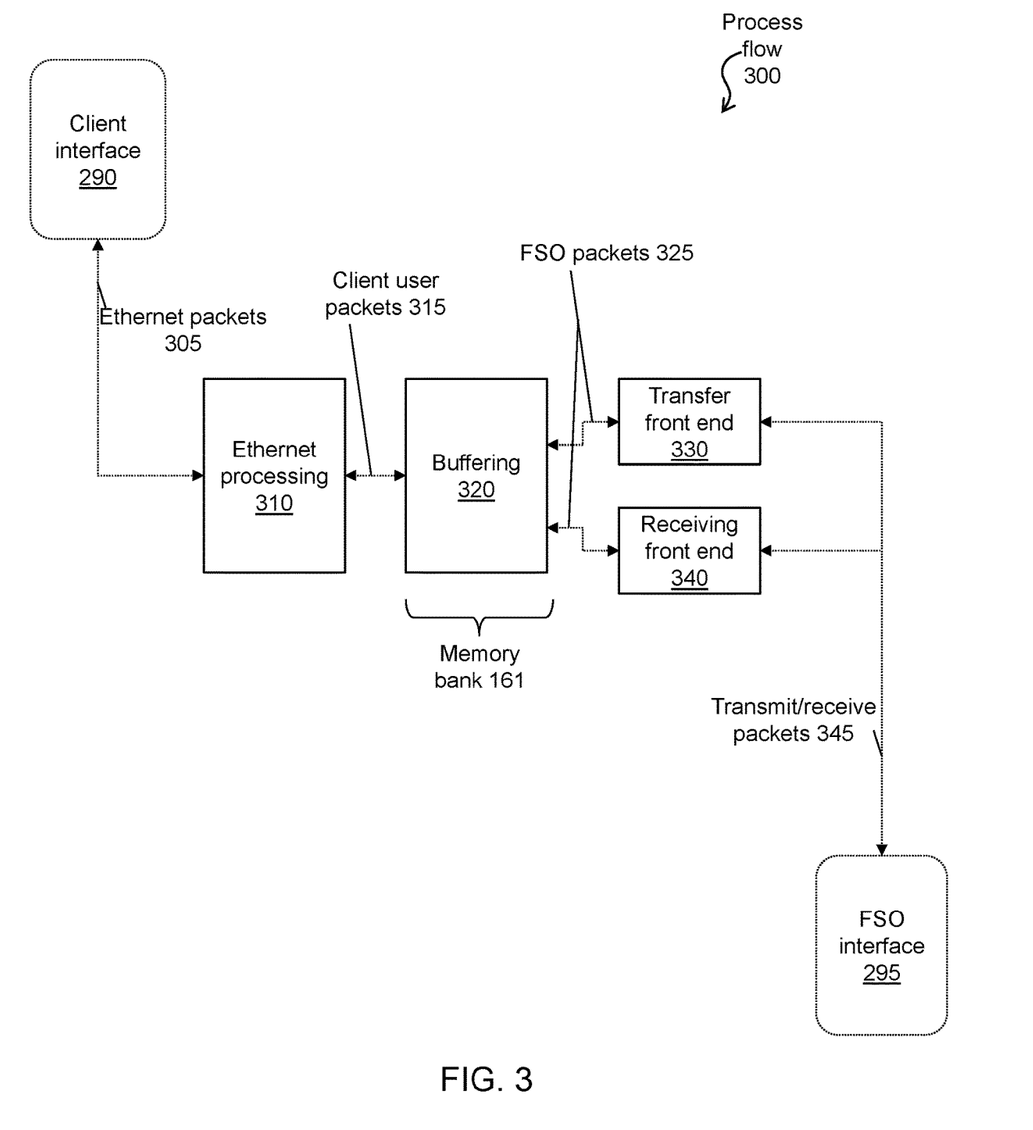
FIG. 3 depicts a process flow according to one or more embodiments.

FIG. 3 depicts a process flow 300 according to one or more embodiments. The process flow 300 is an example operation of the architecture 160 of FIG. 1 in view of the data process operations 200 of FIG. 2. For ease of explanation, the memory bank 161 of FIG. 1, and the client interface 290 and the FSO interface 295 of FIG. 2, as previously described, are used and referred to again with regard to FIG. 3.

As shown in FIG. 3, Ethernet packets 305 (e.g., Ethernet frames), which may be 10-Gigabit Ethernet packets 305, are sent and received between the client interface 290 and an Ethernet processing 310. At the Ethernet processing 310, any received Ethernet packets 305 are re-packaged as client user packets 315 (e.g., FSO segments). In this regard and as described herein, the packetizer operations 230 (FIG. 2) tracks, processes, and re-packages the Ethernet frames from the Ethernet physical layer operations 220 into FSO segments.

The client user packets 315 (e.g., FSO segments) are sent and received between the Ethernet processing 310 and buffering 320. For instance, at the buffering 320, any received client user packets 315 are managed by a memory multiplexing arbiter of the buffering and retransmitting control operations 240 for storage in the TX buffer (e.g., the memory bank 161 of FIG. 1). The FSO packets 325 (e.g., FSO segments that are already stored on the memory bank 161 of FIG. 1) are sent and received between the buffering 320 and transfer and receiving front ends 330 and 340. That is, once the FSO packets 325 are transmitted out of the buffering 320 to the transfer and receiving front ends 330 and 340, the FSO packets 325 are conditioned for transmission over the FSO link as transmit/receive packets 345 (e.g., with respect to line side grooming operations 250 for grouping and encoding the FSO segments into FSO frames that include the preamble). Further, transmit/receive packets 345 are sent and received between the transfer and receiving front ends 330 and 340 and the FSO interface 295.

Figure 4:
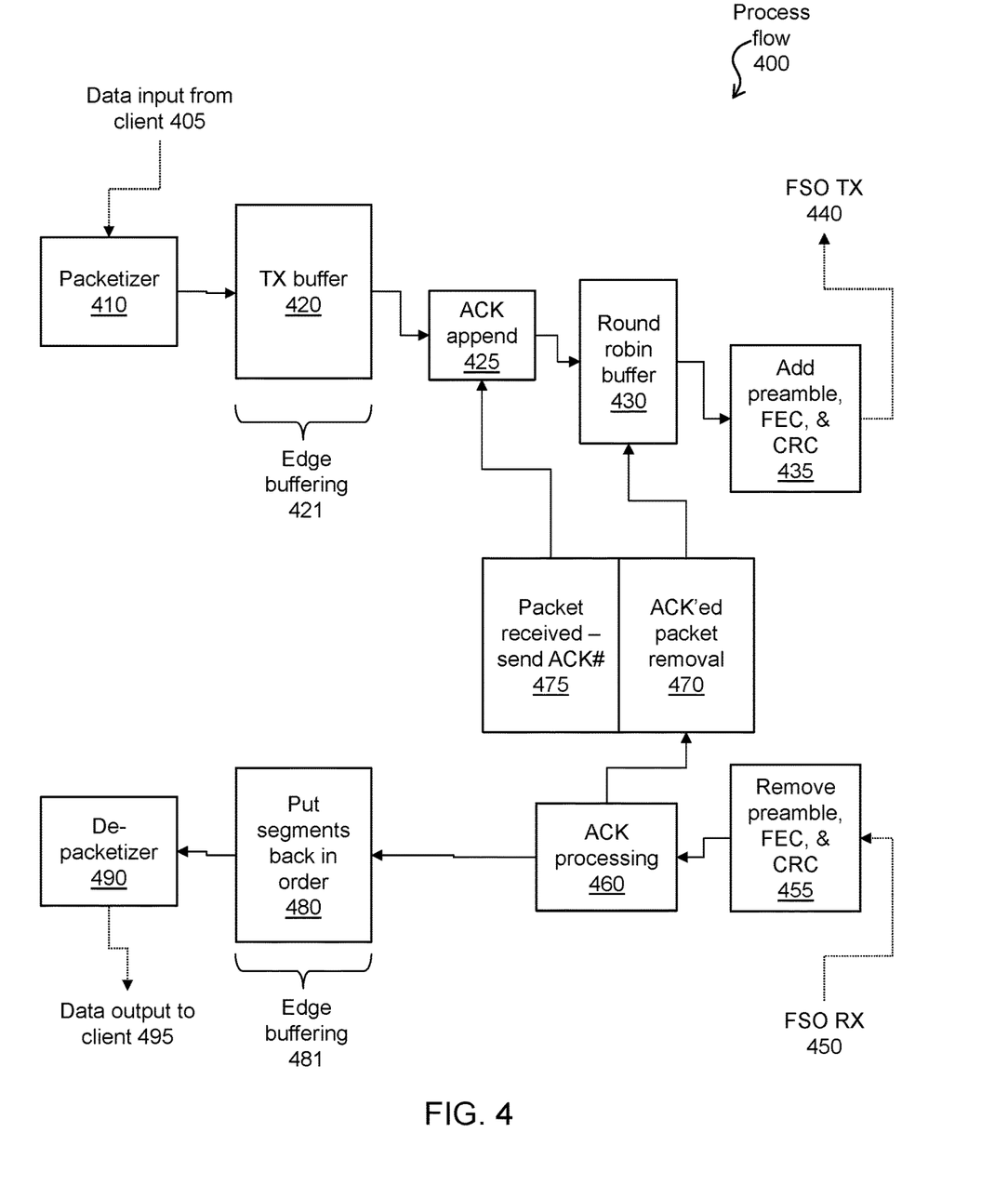
FIG. 4 depicts a process flow according to one or more embodiments.

FIG. 4 depicts a process flow 400 according to one or more embodiments. The process flow 400 is an example operation of the architecture 160 of FIG. 1 in view of the data process operations 200 of FIG. 2. The process flow 400 illustrates that a data input from a client 405 is received. The data input is the data/information of the Ethernet frames. At block 410, the operations previously described in the packetizer operations 230 of FIG. 2 are performed for outgoing data (e.g., adding the segment IDs to the data/information to create FSO segments). In turn, FSO segments that include the data/information are provided to a TX buffer (e.g., the memory bank 161 of FIG. 1). At block 420, the TX buffer holds the FSO segments as an edge buffering 421. Edge buffering 421 allows elastic retention of the FSO segments to allow error free client data in the presence of FSO link fades.

Figure 5:
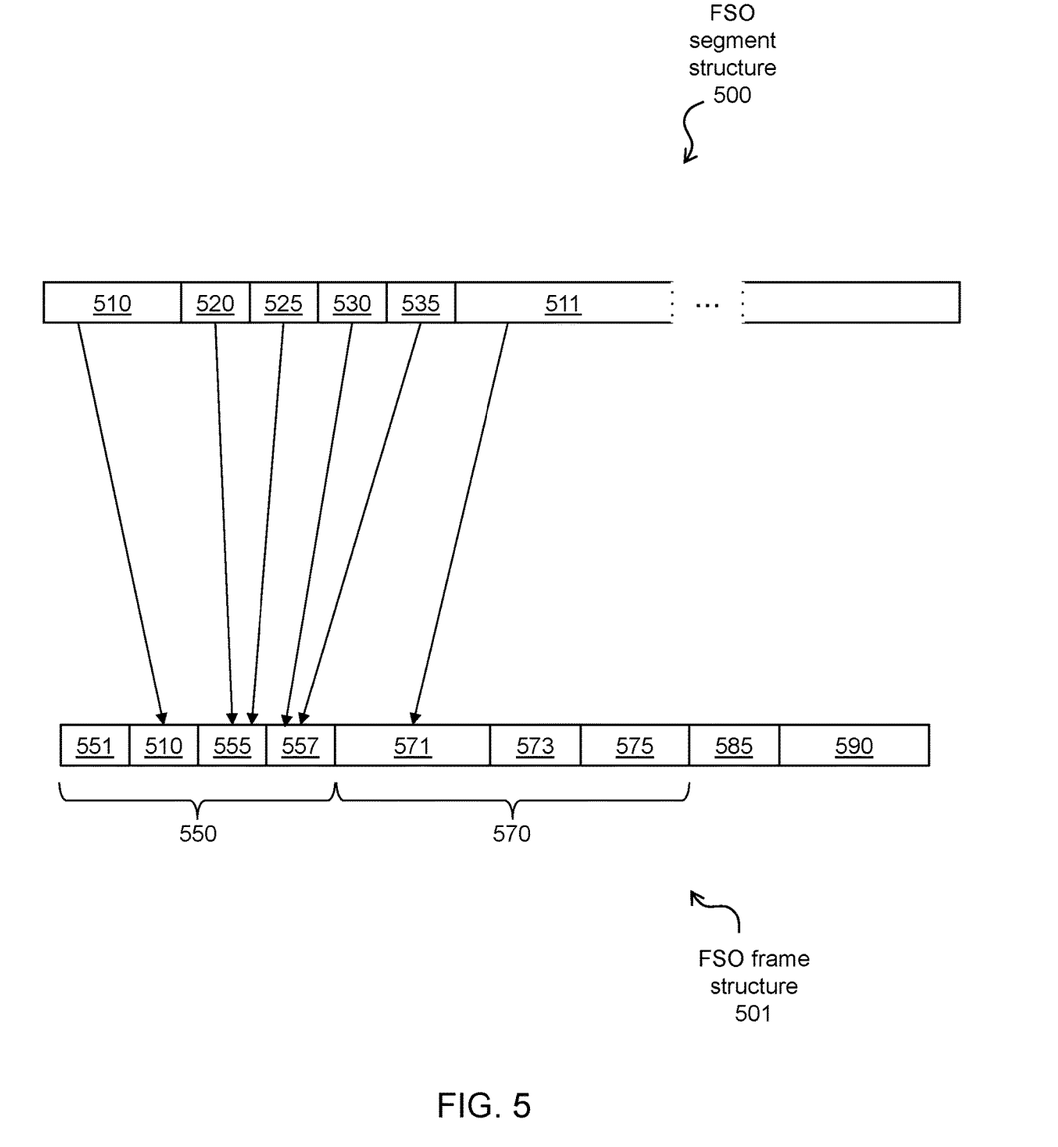
FIG. 5 depicts diagrams of packet and frame structures according to one or more embodiments.

At block 425, ACK appending and generation is performed. FIG. 5 depicts diagrams of packet and frame structures after ACKs are generated (e.g., an FSO segment structure 500 and an FSO frame structure 501) according to one or more embodiments. The segment structure 500 includes a segment ID 510 followed by a client payload field 511 that constitutes the data stored within the memory bank (e.g., the memory bank 161 FIG. 1 and as shown with respect to blocks 410 and 480 of FIG. 4). When the FSO frame structure 501 (also represented in 345 FIG. 3) is received from the FSO link, an ACK is created and encoded on outgoing packets (onto the FSO segment structure 500). To guarantee a high degree of certainty of the ACK getting back over a faded link, the four most recent ACK values 520, 525, 530, and 535 are encoded on each FSO segment structure 500. When a new FSO segment (shown to the right of FSO segment structure 500 in FIG. 5) is received, that new FSO segment is added to the ACK roster and ages out the oldest ACK. Further, the FSO segment structure 500 is encoded into the FSO frame structure 501. As shown in FIG. 5, the FSO frame structure 501 has a section 550 (e.g., a 32 byte section) that includes a preamble 551, the segment ID 510, a first ACK field 555 that includes the ACK values 520 and 525, and a second ACK field 557 that includes the ACK values 530 and 535. The FSO frame structure 501 also has a payload 570 (e.g., also depicted as the client payload field 511) that contains whole and fragmented client Ethernet frames as well as a method to re-assemble the frames over FSO segment boundaries. In this example, the section 550 includes a 7608 byte payload that includes a transmission control protocol (TCP) packet 571, a user diagram protocol (UDP) packet 573, and a TCP packet fragment 575. After the payload 570, the FSO frame structure 501 includes a CRC field 585 (e.g., 8 bytes) and a 7% overhead FEC parity field 590 (e.g., 512 bytes).

Returning to FIG. 4, at block 430, round-robin buffer operations are performed. Due to the propagation delay of the channel, a round robin buffer of transmit packets is used to keep unique and viable data "in the air." The size of the buffer is directly related to the propagation delay of the channel. In this regard, the size can relate to a time it takes for an FSO frame to be transmitted, received, and an ACK to be returned.

To manage this, round robin buffer circuitry (e.g., the buffering and retransmitting control 240 of FIG. 2) uses ACK information as well as a current maximum segment ID in the TX buffer to update a RAM (e.g., the memory bank 161 of FIG. 1), which contains the segment ID's of the FSO segments that constitute the current round robin buffer. The RAM can then be used to request the correct FSO segments from the TX buffer and feed these requests out to preamble/CRC modules through a first in first out (FIFO) process. The round robin buffer circuitry reads the value of an address location, gets the next segment ID from it (unless the location contains a 0 value, which is a null segment ID), and initiates a packet request for that FSO segment from the priority multiplexing of the buffering and retransmitting control 240. The address of the RAM is then incremented by one and the process is repeated.

At block 435, the preamble itself, along with values, are added to the FSO segment structure 500 to produce the FSO frame structure 501 by a direct mode segment conditioning for sending to FSO TX 440. The direct mode segment conditioning includes a CRC operation on the packet structure 501, a scrambler encoding, a forward error correction (FEC) addition, and a 64-bit preamble pattern addition.

The CRC operation is performed on each segment (e.g., FSO segment) that is transmitted and the result is appended to the end of the segment. Upon reception on the opposite side of the FSO link, after FEC decode corrects as many errors as it can, the CRC operation is ran again on the packet (e.g., the FSO segment structure 500) and the output is compared to the result at the end of the packet. If there is a mismatch (e.g., bit errors), then the packet is discarded.

The scrambler encoding includes scrambling each packet with a pseudorandom binary sequence (PRBS) pattern before being transmitted to remove long series of 1's and 0's that cause problems with clock recovery and also to maintain DC balance.

The FEC addition includes when the CRC and scrambled values are both protected by FEC. These combined values are passed through a module which calculates the redundancy data and appends it to the data packet.

Note that a 64-bit known preamble sequence (e.g., preamble 551) is appended to a beginning of each segment after scrambling. This appending enables detection of a start of the FSO frame structure 501 by the receiver. The preamble search in the receiver continuously correlates the incoming segment against the preamble sequence and performs best match selection for each segment.

Figure 6:
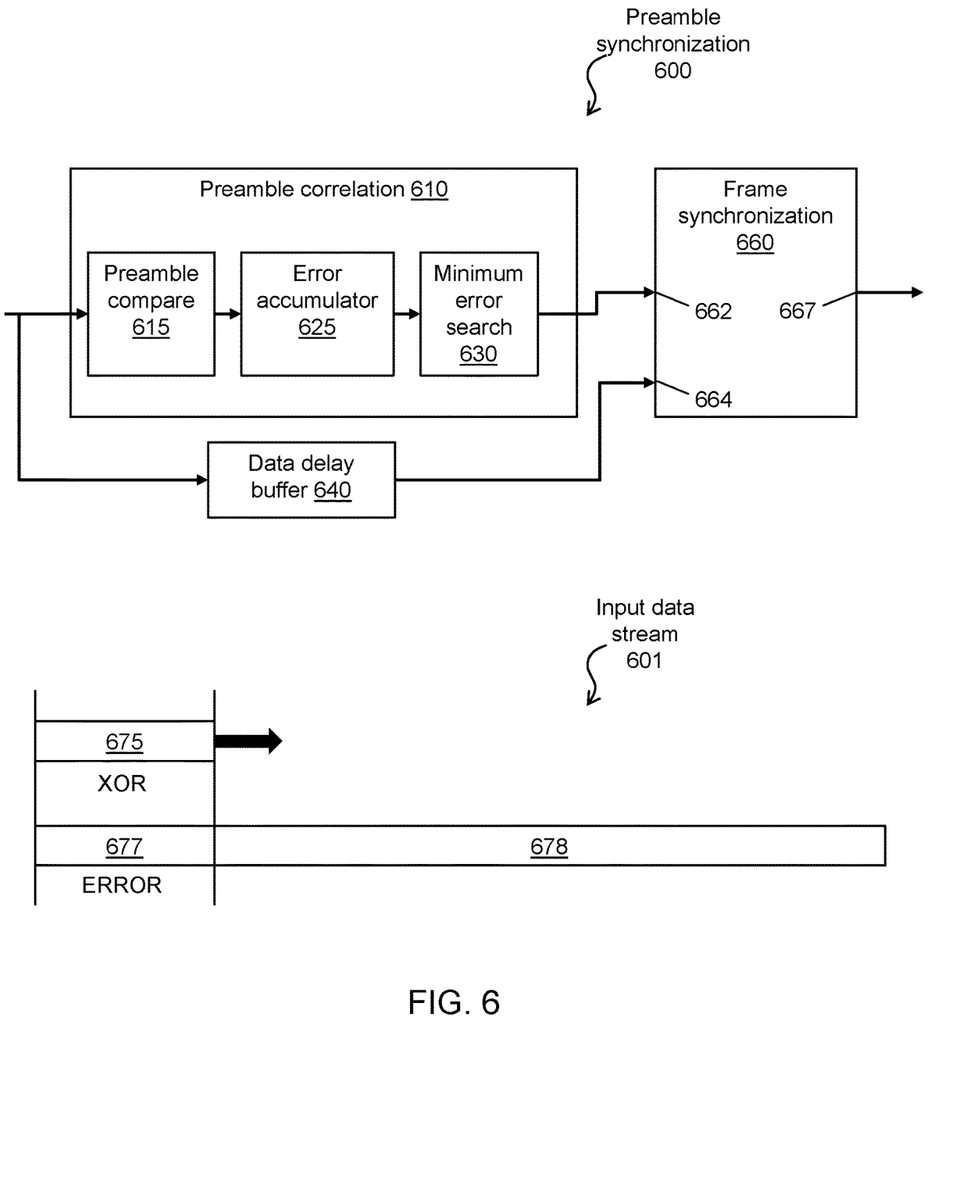
FIG. 6 depicts a preamble synchronization and data stream according to one or more embodiments.

Turning now to FIG. 6, a preamble synchronization 600 and input data stream 601 are depicted according to one or more embodiments. Under the preamble synchronization 600, an FSO frame is received by a preamble correlation 610. The preamble correlation 610 then performs a preamble compare 615, executes an error accumulator 625, and performs a minimum error search 630. Simultaneously, a data delay buffer 640 stores the incoming FSO frame. Once the preamble correlation block 610 has processed, a number of bits equal to the FSO segment length the minimum error location is chosen 662 and the data (664) is streamed out from the correct RAM location in the data delay buffer 640. The resultant aligned frame data 667 is then provided to the channel. The input data stream 601 illustrates the preamble compare 615 operation. As data is fed into the preamble synchronization module (represented as 678) the preamble sequence 675 is compared against the incoming data and a pattern mismatch error 677 is generated via exclusive or (XOR) operation for each bit location within the FSO frame.

The process flow 400 of FIG. 4 further illustrates that an FSO frame from the channel 450 is received. At block 455, the preamble itself, along with values, are removed from the FSO frame structure 501 to produce the FSO segment structure 500.

Figure 7:
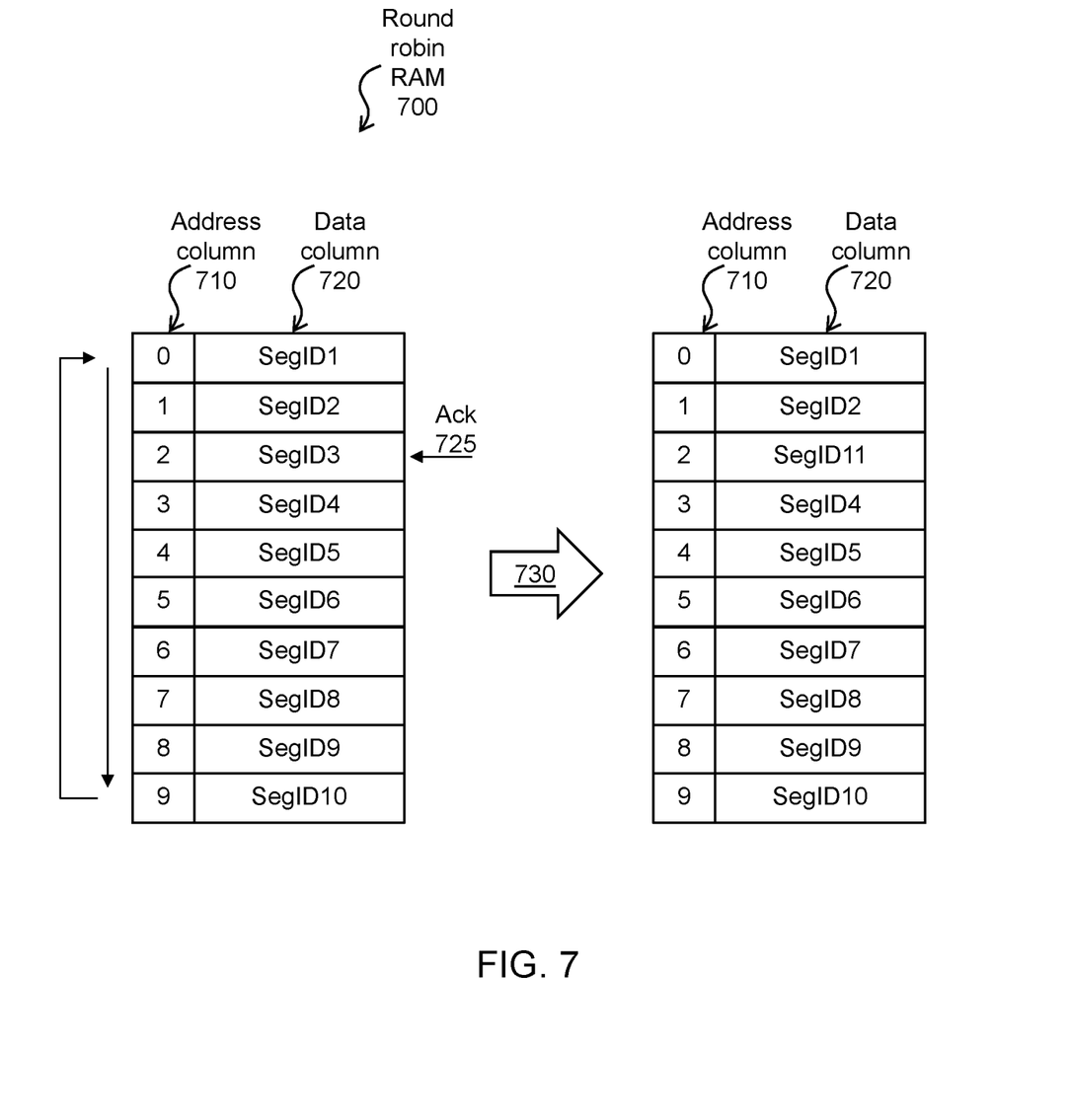
FIG. 7 depicts a diagram of an acknowledgement processing according to one or more embodiments.

At blocks 460 and 470, the ACKs of the FSO segments are processed and removed from the round robin buffer 430 where appropriate. FIG. 7 depicts a diagram of an acknowledgement processing according to one or more embodiments. The acknowledgement processing is an illustration of the round robin RAM and received ACK process. The round robin RAM 700 includes an address column 710 and a data column 720. When an ACK is received 725, each RAM location is read, and if the ACK Segment ID matches any of the current RAM values then the location is re-written 730 with the next Segment ID (SegID #) to be used in the round robin buffer (note the change in from SegID3 to SegID11 for address 2, for example). In the event that the TX buffer is empty (as determined by the current maximum segment ID in the TX buffer), zero will be written into the RAM location with the ACK'ed packet. An empty counter will also be incremented which signifies the number of empty locations within the round robin RAM. As soon as more data is available from the TX buffer, the empty locations are filled with fresh data, and the empty counter is decremented. When the read operation of the TXRR module comes upon a location with 0 in it (empty), it will increment the address by one and repeat in order to find the next segment to send.

Returning again to FIG. 4, at block 475, any received segments with new segment IDs generate ACKs that are sent to 425 to be appended to the outgoing data stream. At block 480, FSO segments are provided to the RX buffer (e.g., the memory bank 161 of FIG. 1).

At block 490, a depacketizer processes the FSO segment structure 500 received from the receive buffer to provide a client data output. In turn, a data output is provided to the client 495 (e.g., data/information within an Ethernet frame).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The Figures illustrate the architecture, functionality, and operation of possible implementations of systems, methods, and computer program products according to various embodiments. In this regard, each block in the Figures may represent one or more components, units, modules, segments, or portions of instructions, which comprise one or more executable instructions for implementing the specified logical function(s). The functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the Figures, and combinations of blocks in the Figures, can be implemented by special purpose hardware-based systems that perform the specified functions or acts or carry out combinations of special purpose hardware and computer instructions.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A free-space optical (FSO) retransmission device comprising:
   a memory bank partitioned into a source buffer indexed by segment identifications (IDs);
   an interface in communication with an optical terminal and an Ethernet network;
   a programmable circuit executing data process operations comprising:
   receiving data from the Ethernet network;
   generating a FSO segment comprising the data received from the Ethernet network and a segment ID;
   generating and transmitting an outgoing FSO frame to the optical terminal, the outgoing FSO frame comprising the outgoing FSO segment; and
   storing the outgoing FSO segment in the source buffer until a corresponding acknowledgement is received in an inbound FSO frame from the optical terminal.

2. The FSO retransmission device of claim 1, wherein the data processing operations include packetizer operations that tracks, processes, and re-packages Ethernet frames including the data and the segment ID into the FSO segment.

3. The FSO retransmission device of claim 1, wherein the data process operations include Ethernet physical layer operations that generate and implement Ethernet protocols to communicate Ethernet frames including the data with the Ethernet network.

4. The FSO retransmission device of claim 1, wherein the interface comprises a quad small form-factor pluggable is split into four independent 10-Gigabit Ethernet ports to provide a client interface to the Ethernet network and a FSO interface to the FSO terminal.

5. The FSO retransmission device of claim 1, wherein the data process operations include controlling and monitoring operations that provide monitoring and reporting of real time data and channel statistics for transmissions of the outgoing FSO frame.

6. The FSO retransmission device of claim 1, wherein the data process operations include controlling and monitoring operations that provide 1-Gigabit Ethernet command and control interface that implements sending command and control data (e.g., GPS coordinates) between Ethernet network and the optical terminal.

7. The retransmission device of claim 1, wherein the data process operations include buffering and retransmitting control operations that provide round robin buffer control operations with respect to the memory to fill a FSO link of the optical terminal with the FSO frame for a total round trip propagation time of the FSO link.

8. A method performed by a free-space optical (FSO) retransmission device comprising a memory bank partitioned into a source buffer indexed by segment identifications (IDs), an interface in communication with an optical terminal and an Ethernet network, and a programmable circuit,
wherein the method includes executing data process operations by the programmable circuit, the data processing operations comprising:
receiving data from the Ethernet network;
generating a FSO segment comprising the data received from the Ethernet network and a segment ID;
generating and transmitting an outgoing FSO frame to the optical terminal, the outgoing FSO frame comprising the outgoing FSO segment; and
storing the outgoing FSO segment in the source buffer until a corresponding acknowledgement is received in an inbound FSO frame from the optical terminal.

9. The method of claim 8, wherein the data processing operations include packetizer operations that tracks, processes, and re-packages Ethernet frames including the data and the segment ID into the FSO segment.

10. The method of claim 8, wherein the data process operations include Ethernet physical layer operations that generate and implement Ethernet protocols to communicate Ethernet frames including the data with the Ethernet network.

11. The method of claim 8, wherein the interface comprises a quad small form-factor pluggable is split into four independent 10-Gigabit Ethernet ports to provide a client interface to the Ethernet network and a FSO interface to the FSO terminal.

12. The method of claim 8, wherein the data process operations include controlling and monitoring operations that provide monitoring and reporting of real time data and channel statistics for transmissions of the outgoing FSO frame.

13. The method of claim 8, wherein the data process operations include controlling and monitoring operations that provide 1-Gigabit Ethernet command and control interface that implements sending command and control data (e.g., GPS coordinates) between Ethernet network and the optical terminal.

14. The method of claim 8, wherein the data process operations include buffering and retransmitting control operations that provide round robin buffer control operations with respect to the memory to fill a FSO link of the optical terminal with the FSO frame for a total round trip propagation time of the FSO link.

15. A computer program product stored on a non-transitory computer readable medium of a free-space optical (FSO) retransmission device, the non-transitory computer readable medium storing program instructions thereon, the FSO retransmission device comprising a memory bank partitioned into a source buffer indexed by segment identifications (IDs), an interface in communication with an optical terminal and an Ethernet network, and a programmable circuit,
wherein the program instructions executable by at least the programmable circuit to cause the programmable circuit to execute data process operations comprising:
receiving data from the Ethernet network;
generating a FSO segment comprising the data received from the Ethernet network and a segment ID;
generating and transmitting an outgoing FSO frame to the optical terminal, the outgoing FSO frame comprising the outgoing FSO segment; and
storing the outgoing FSO segment in the source buffer until a corresponding acknowledgement is received in an inbound FSO frame from the optical terminal.

16. The computer program product of claim 15, wherein the data processing operations include packetizer operations that tracks, processes, and re-packages Ethernet frames including the data and the segment ID into the FSO segment.

17. The computer program product of claim 15, wherein the data process operations include Ethernet physical layer operations that generate and implement Ethernet protocols to communicate Ethernet frames including the data with the Ethernet network.

18. The computer program product of claim 15, wherein the interface comprises a quad small form-factor pluggable is split into four independent 10-Gigabit Ethernet ports to provide a client interface to the Ethernet network and a FSO interface to the FSO terminal.

19. The computer program product of claim 15, wherein the data process operations include controlling and monitoring operations that provide monitoring and reporting of real time data and channel statistics for transmissions of the outgoing FSO frame.

20. The computer program product of claim 15, wherein the data process operations include controlling and monitoring operations that provide 1-Gigabit Ethernet command and control interface that implements sending command and control data (e.g., GPS coordinates) between Ethernet network and the optical terminal.

\* \* \* \* \*